United States Patent
Kogan et al.

(10) Patent No.: US 10,161,382 B2
(45) Date of Patent: Dec. 25, 2018

(54) INDUCED-FLOW WIND POWER SYSTEM

(71) Applicants: Alexander G. Kogan, Pasco, FL (US); Filipp Kogan, Ste. Genevieve, MO (US); Genrikh Kleynerman, San Jose, CA (US); Victor Timofeev, Krasnodar (RU)

(72) Inventors: Alexander G. Kogan, Pasco, FL (US); Filipp Kogan, Ste. Genevieve, MO (US); Genrikh Kleynerman, San Jose, CA (US); Victor Timofeev, Krasnodar (RU)

(*) Notice: Subject to any disclaimer, the term of this patent is extended or adjusted under 35 U.S.C. 154(b) by 99 days.

(21) Appl. No.: 15/206,276

(22) Filed: Jul. 10, 2016

(65) Prior Publication Data
US 2018/0010575 A1    Jan. 11, 2018

Related U.S. Application Data

(60) Provisional application No. 62/190,998, filed on Jul. 10, 2015.

(51) Int. Cl.
*F03D 3/04*    (2006.01)
*H02K 7/18*    (2006.01)
*F03D 9/41*    (2016.01)

(52) U.S. Cl.
CPC .......... *F03D 3/0427* (2013.01); *F03D 9/41* (2016.05); *F05B 2220/30* (2013.01); *F05B 2240/123* (2013.01); *F05B 2240/131* (2013.01); *F05B 2240/133* (2013.01)

(58) Field of Classification Search
CPC ....... F03D 3/0427; F03D 9/008; H02K 7/183; F05B 2220/30; F05B 2240/123
See application file for complete search history.

(56) References Cited

U.S. PATENT DOCUMENTS

| | | | |
|---|---|---|---|
| 7,811,048 B2 | 10/2010 | Allaei | |
| 9,294,013 B2* | 3/2016 | Allaei | ............... F03D 1/04 |
| 9,567,856 B2* | 2/2017 | Faller | ............... F03B 13/264 |
| 2003/0026684 A1* | 2/2003 | Bohn | ............... F03D 1/04 |
| | | | 415/1 |

(Continued)

*Primary Examiner* — Tulsidas C Patel
*Assistant Examiner* — Joseph Ortega
(74) *Attorney, Agent, or Firm* — Crawford IP Law; David E. Crawford (57) ABSTRACT

A high efficiency induced-flow wind power system engages and converts both potential (to-pull) and kinetic (to-push) wind energies to effective airflow power, delivering induced (accelerated) airflow power in a controlled flow field to a turbine/rotor, impelling a 360-degree torque on the turbine/rotor and, as a result, extracting (converting) more than 80% of the combined effective wind power to mechanical power. The induced push-pull effect results in higher efficiency wind-to-mechanical power extraction (conversion). The induced-flow wind power system can be coupled with (i) an electrical generator, inverter/converter for generating AC and DC power, (ii) pressurized vessel for effective energy storage (iii) a pressurized structure, such as an air supported structure, to ensure its structural integrity. The Induced-Flow Wind System embodiment comprises: a passive-flow nozzle, an active-flow nozzles and a turbine encased in housing interposed within the flow field of the active-flow nozzle and coupled with an electrical generator or a compressor.

20 Claims, 4 Drawing Sheets

(56) References Cited

U.S. PATENT DOCUMENTS

| | | | | |
|---|---|---|---|---|
| 2005/0150225 A1* | 7/2005 | Gwiazda | ............ | F03D 1/04 |
| | | | | 60/641.1 |
| 2010/0310361 A1* | 12/2010 | Carre | ............ | F03D 1/025 |
| | | | | 415/199.5 |
| 2012/0175882 A1 | 7/2012 | Sterling | | |
| 2014/0369826 A1* | 12/2014 | Rohring | ............ | F03D 1/04 |
| | | | | 415/207 |

* cited by examiner

INDUCED-FLOW WIND POWER SYSTEM

CROSS REFERENCE TO RELATED APPLICATIONS

Applicants claim priority to the U.S. Provisional Patent Application No. 62/190,998, filed on Jul. 10, 2015, and titled "Wind Inducing Funnel", and which is hereby incorporated by reference.

BACKGROUND

1. Field of Disclosure

The present disclosure relates to the field of wind energy conversion. More specifically, the present disclosure relates to an induced-flow wind power system that engages and converts both potential and kinetic wind energies to effective airflow power, delivering induced (accelerated) airflow in a controlled flow field to a turbine and, as a result, extracting (converting) more than 80% of the combined effective wind power to mechanical power.

The induced-flow wind power system can be mechanically coupled with an electrical generator to produce electrical power (AC and/or DC), or mechanically coupled with a compressor to (i) pump ambient air into a high-pressure energy storage vessel (example: air-supported structure or a container) for subsequent controlled expulsion of the compressed air through a high velocity jet to a secondary turbine/rotor, coupled with an electrical generator, to effectively produce consistent electrical power output, and (ii) to pump air to a pressurized structure, such as an air-supported structure, to ensure its structural integrity.

2. Description of Related Art

Two main categories of wind power conversion systems are referenced herein (i) conventional wind turbine, and (ii) novel Venturi-type airflow delivery concepts. Specifically, conventional wind turbines are in their mature technology stage and are classified as Vertical Axis Wind Turbines (VAWT), which are primarily associated with wind-mechanical-electrical power conversion efficiencies between 25-30% and the Horizontal Axis Wind Turbines (HAWT), which leads the conventional category in efficiency of 35-47% extraction of the open flow wind power. Both types of conventional wind energy systems rely on and convert, within their respective efficiencies, the open flow wind power (input wind energy) which directly engages the turbine/rotor swept area.

Novel Venturi-type airflow delivery concepts are in their early stage of technological development. These concepts are generally ducted systems, which also use conventional type turbines/rotors interposed within the constricting ducted flow field where airflow power is harnessed and converted to mechanical-electric power. As in any conventional wind power system, novel Venturi-type concepts also rely on the input (kinetic) wind power from the open flow wind for mechanical-electrical power generation. These systems harness the open wind at the intake section (swept area) of the duct and further directs the flow through a constricting area to the turbine. Subsequently, the intake area of the duct has a larger diameter (swept area), which for the sake of comparing efficiencies should be comparable to the swept area of a conventional system, and the throat area with a relatively smaller diameter, wherein a smaller diameter (smaller swept area) conventional type turbine/rotor may be interposed.

The novel Venturi-type airflow delivery concepts suggest, that by harnessing the open flow wind through a larger intake and diverting the wind (airflow) through a constriction to the turbine will result in an accelerated wind (airflow) stream, per a Venturi-effect, and subsequently result in a higher airflow power density, which is then harnessed by the turbine.

However, as described herein, both conventional and novel Venturi-type airflow delivery concepts rely on the kinetic (push) energy of the wind, i.e., the Wind Power Density expressed in watts per meter squared of the swept area (W/m2). Subsequently, the total effective power that can be produced by any wind energy conversion system is proportional to the open flow wind (airflow) power density, as a function of the air density and the cube of wind velocity, multiplied by the effective swept area (the area engaged by the open flow wind) and reduced by friction losses and imperfection in turbine/rotor design.

Furthermore, Betz's law indicates that the theoretical maximum power that can be extracted from the wind in open flow, independent of the design of the wind turbine, is 16/27 (59.3%) of the kinetic (push) energy. Therefore, the technological drivers in wind energy conversion aim to extract wind power closer to Betz's limit.

As it is known, the five main directions of R&D in today's wind industry aim to convert the push force related to the kinetic energy of the wind to mechanical-electrical power. These efforts include:

1. Increase the intake wind power density to the turbine;
   Geographical locations (off-shore wind, wind valleys, elevated points, etc.) and
   Wind in-take channels (Venturi) for accelerating wind to the turbine
2. Increase rotor swept area (develop and introduce new, stronger and lighter materials to provide stability);
3. Increase effectiveness of the wind energy conversion (aerodynamics of the blades, fans, and rotors);
4. Increase power generating capabilities and effectiveness (permanent magnet generators (PMG)); and
5. Reduce the unpredictability effect of the wind (energy storage systems).

Within the sphere of the technical advancements to date, HAWT are still the most advanced in terms of their ability to extract more of the available wind energy for any given swept area. This is because HAWT use most of its turbine/rotor diameter to harness the open wind flow. The VAWT, by its design, only harnesses wind power with ⅓ of its total rotor area at any point in time, giving VAWT an automatic disadvantage, compared with HAWT, in terms of the maximum attainable efficiency relative to the available open flow wind power.

Novel Venturi-type systems, harness open flow wind at the system's largest intake point (swept area) and redirect the wind flow through a constriction to increase the wind (airflow) velocity and the overall wind (airflow) power density (W/m$^2$) that is delivered to a generally smaller diameter turbine/rotor, which is interposed in the constriction section of the ducted flow field. Although the airflow velocity may be increased through this process, the total available open flow wind energy, swept by the intake of the duct, doesn't increase. Furthermore, ducting and diverting the airflow causes partial energy loss due to friction, which adversely affects the extraction (conversion) efficiency of the open flow wind power to mechanical-electric power in such systems.

Respectively, according to the Energy Conservation law, just increasing the velocity of the wind flow in the constricting flow field does not increase the overall wind power that is made available in the flow field for extraction (conversion) to mechanical-electric power, which is a function of the harnessed open flow wind power density and the intake/swept area. Consequently, ducting the open flow wind through a constriction, in order to accelerate the velocity of the airflow to the turbine, adversely affects efficiency, compared with HAWT, due to friction losses, resulting in less overall wind power that is available in the ducted flow field for subsequent extraction (conversion) by the smaller swept area turbine; relative to the total available open flow wind energy that's is harnessed by the larger intake section at the front-end of the flow field, which is ultimately the area and the total available wind power reference that should be used in comparing extraction (conversion) efficiencies of any wind power system, specifically in comparing advantages of conventional and novel wind power technologies.

3. Advantages of the Invention

According to the Energy Conservation Law, any energy conversion system can extract only a fraction of the total available energy. The total available energy for conventional wind power systems and novel Venturi-type airflow delivery systems is the kinetic energy of the open flow wind that engages the effective swept/intake area of the system. The total available energy for the induced-flow wind power system is comprised of (i) the kinetic energy of the open flow wind engaging the active-flow nozzle intake (35%), (ii) the potential energy of the open flow wind engaging the passive-flow nozzle intake (55%), and (iii) the potential energy of the ambient wind overpassing the aerodynamic airfoil configuration 10%. Therefore, the main advantage of the induced-flow wind power system is that it accesses more available energy for extraction (conversion) than the former conventional and Venturi-type systems.

The combined effective power extraction (conversion) efficiency of the induce-flow wind power system can be measured against HAWT efficiencies with comparable swept areas and open flow wind conditions, providing a relative 160% advantage for the Induced-Flow Wind Power System over the highest rated efficiencies attained by HAWT.

The induced-flow wind permits the incorporation of a higher efficiency industrial type radial-to axial airflow turbine/rotor, such as a Francis-type turbine modified configuration, which can (i) more effectively convert the combined wind energy to mechanical-electrical power with 80% efficiency, and (ii) acting as a flywheel, stabilize energy production during wind gusts.

Furthermore, the absence of moving components at higher elevation reduces the dynamic pressure that is applied to the system, which provides an advantage for operation in higher velocity wind conditions. Specifically, permitting induced-flow wind power system to operate within a wider range of ambient wind conditions, harnessing closer to 100% of the Betz limit in accordance with a wind distribution curve for any geographic location, while a conventional wind power system will harness closer to 75% to 80% of the Betz limit in the same geographic location. This advantage is further amplified through a synergetic coupling of the induced-flow wind power system with a high-pressure energy storage vessel, such as an air-supported structure, through a compressor, which allows the system to pump ambient air to the pressurized structure in any wind condition for energy storage and subsequent controllable distribution to a secondary turbine/rotor coupled with an electrical generator; thereby, producing consistent power output and eradicating the unpredictability effect in wind power generation.

BRIEF SUMMARY

The Induced-Flow Wind Power System consists of (i) a passive-flow nozzle with aerodynamic airfoil configuration, fluidly coupled at the exhaust space of the active-flow nozzle, which is responsible for engaging higher altitude higher velocity open flow wind to produce low pressure behind the turbine space, stimulated acceleration and evacuation of the intake airflow through the turbine, (ii) an active-flow nozzle for delivering accelerated open flow wind to the turbine space in a controlled flow field (iii) a housing designed to contain pressure and produce a 360-degree uniform air pressure (torque) to the blades of the encased turbine, and (iv) a radial-to-axial airflow turbine (rotor), such as a Francis-type turbine modified configuration, encased in the housing, coupled with an electrical generator for producing electrical power or a compressor for pumping air.

The passive-flow nozzle with aerodynamic airfoil configuration, having an intake converging to a throat (constriction), a diffuser diverging from the throat, and a vacuum inlet interposed within the throat and diffuser section. The passive-flow nozzle is horizontally oriented (parallel to the ground) and installed at an elevation height H above the turbine space with the vacuum inlet centered over the vertical axis of the housing fluidly coupling with the vertically oriented active-flow diffuser cone of the active-flow nozzle, thereby connecting the two flow fields.

The active-flow nozzle, comprised of a housing having an inlet oriented in the direction of the radial axis of the encased turbine and an outlet oriented in the direction vertical to the axial axis of the turbine. Furthermore, the inlet is fluidly coupled with an intake, diverging perpendicularly from the housing space, and the outlet is fluidly coupled with a diverging diffuser cone, oriented vertically with the central axis of the outlet (axial axis of the turbine), which is fluidly coupled with the vacuum inlet of the passive-flow nozzle at height H above the turbine space.

The turbine, having a radial-to-axial airflow turbine/rotor configuration, such as a Francis-type turbine configuration, is encased in the housing and is mechanically coupled with an electrical generated or a compressor.

The passive-flow nozzle, configured to engage and accelerate higher altitude higher velocity open flow wind through its Venturi channel, produces low pressure (pull force) over the vacuum inlet, causing an acceleration and evacuation of the active-flow nozzle airflow stream through the turbine.

The aerodynamic airfoil affixed on top of the passive-flow nozzle is configured to accelerate higher altitude ambient wind, producing low pressure at the exhaust space of the passive-flow nozzle diffuser, thereby inducing an effective evacuation force for both the passive-flow horizontal vector airflow (though the channel) and the swept airflow from the diffuser cone of the vertically coupled active-flow nozzle.

The vacuum inlet of the passive-flow nozzle is a mixture zone for the passive-flow airflow stream and the active-flow airflow stream. This low-pressure area is configured to produce a pull force (suction), which induces acceleration and evacuation of the airflow through the turbine space.

The radial-to axial turbine is conjured to (i) effectively divert the radial intake airflow (from the active-flow nozzle intake) to axial flow, (ii) discharge the airflow to the active-flow nozzle diffuser cone, (iii) convert potential and kinetic wind (airflow) energy to rotational mechanical power, and (iv) as a flywheel, stabilize energy production during wind gusts.

The turbine may be (i) directly coupled with an electrical generator to produce electrical power, and/or (ii) mechanically coupled with a compressor to pump air into a pressurized storage vessel, such as an air-support structure; which can be expelled through a high-pressure air nozzle to impel a secondary turbine/rotor, coupled with an electrical generator to produce controlled (consistent) electrical power.

The passive-flow and active-flow nozzle intakes may be unidirectional, bidirectional or omnidirectional and, in the case of mono and bi-directional, may be mechanically rotatable in the direction of the headwind.

The embodiment may be a standalone system or may integrate many passive-flow nozzles and active-flow diffusers manifold with a single turbine having a single or multiple active-flow intakes and, in some embodiments, may be integrated with another novel Venturi-type airflow delivery system.

In some embodiments, a ventilation duct or a pre-existing smokestack can be integrated within the active-flow nozzle, specifically within the throat section, to extend the system's overall height (elevation) or the length of the system's flow field.

Other objects, advantages and novel features of the present invention will become apparent from the following detailed description of the invention when considered in conjunction with the accompanying drawings.

REFERENCE NUMERALS IN THE DRAWINGS

| | |
|---|---|
| H | Height of System |
| G | Ground |
| P | Low Pressure |
| AP | Pressure Differential between designated sections of the system |
| 90 | Induced-Flow Wind Power System (I-FWPS or the Embodiment) |
| 300 | Induced-Flow Wind Power System coupled with pressurized vessel |
| 100 | Passive-Flow (pf) Nozzle |
| 101 | pf-intake |
| 102 | pf-throat |
| 103 | pf-diffuser |
| 104 | pf-exhaust space |
| 105 | pf-intake space |
| 106 | Aerodynamic airfoil configuration |
| 80 | Vacuum inlet |
| 200 | Active-Flow (af) Nozzle |
| 201 | af-intake |
| 202 | af-intake space |
| 203 | af-diffuser cone |
| 204 | af-exhaust space |
| 40 | Housing/Housing Space |
| 300 | Housing inlet |
| 42 | Housing outlet |
| 50 | Radial-to-Axial turbine |
| 51 | Turbine axle |
| 52 | Runner blades |
| 53 | Draft tube |
| 60 | Electrical Generator |
| 61 | Compressor |
| 70 | Rotating bearing/joint |
| 71 | Wind Vane |
| 72 | Control system |

DETAILED DESCRIPTION

In the following detailed description of the present embodiments, reference is made to the accompanying drawings that form a part hereof, and which are shown by way of illustration of the specific embodiments that may be practiced. These embodiments are described in sufficient detail to enable those skilled in the art to practice disclosed subject matter and it is to be understood that other embodiments may be utilized and that process, electrical or mechanical changes may be made without departing from the scope of the claimed subject matter. The following detailed description is, thereof, not to be taken in a limiting sense, and the scope of the claimed subject matter is defined only by the appended claims and equivalents thereof.

Figure 1:
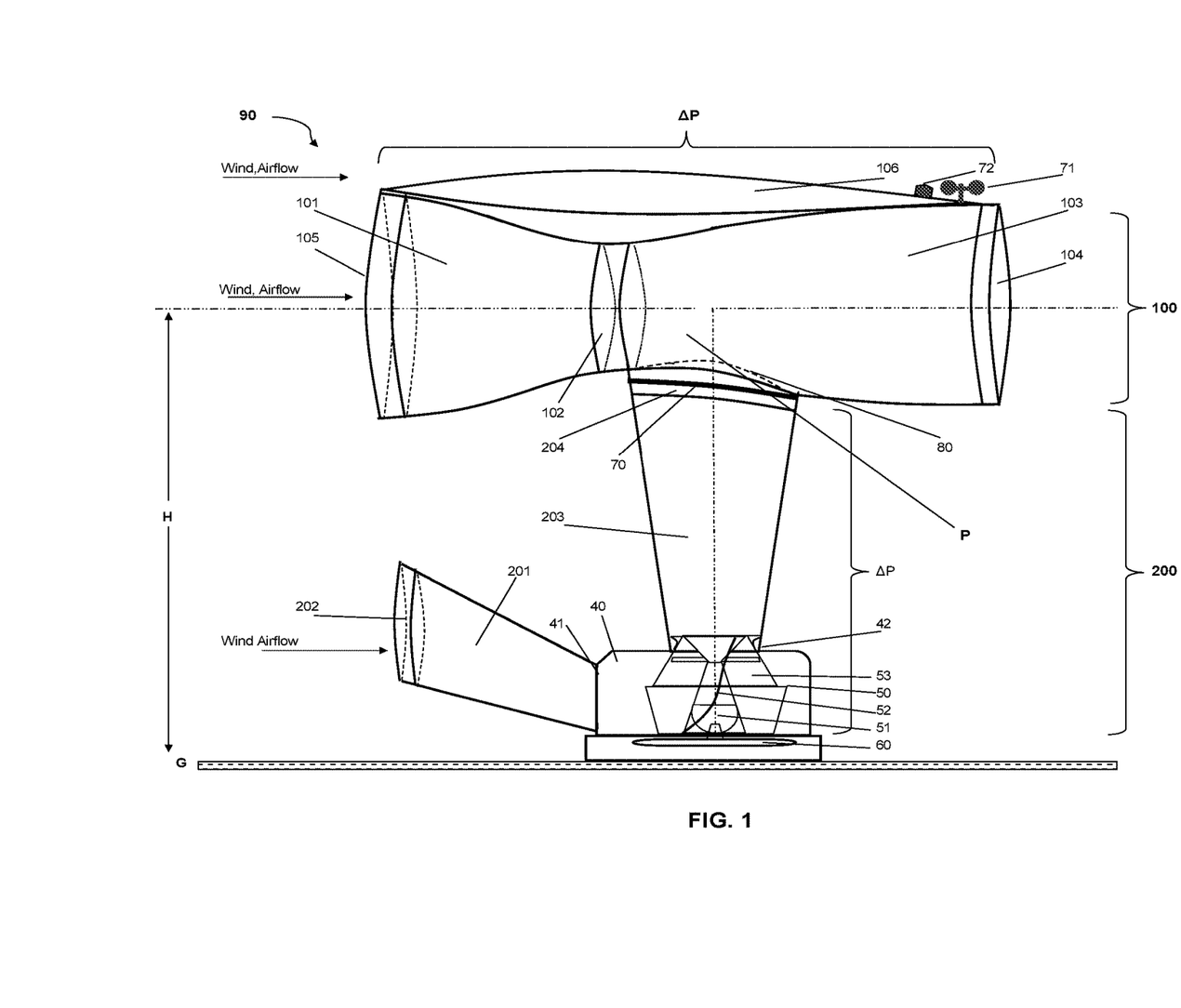
FIG. 1 is a perspective view of an embodiment of an Induced-Flow Wind Power System, according to an embodiment of the present invention.

FIG. 1 is a perspective view of the Induced-Flow Wind Power System 90. I-FWPS 90 includes (i) a passive-flow (pf) nozzle 100 with aerodynamic airfoil configuration 106, (ii) an active-flow (af) nozzle 200 fluidly coupled with said passive-flow nozzle 100, (iii) a housing 40 fluidly coupled within said active-flow nozzle 200, (iv) a turbine 50, such as a radial-to-axial flow, Francis-type turbine configuration, encased said housing 40 and coupled mechanically with an electrical generator 60 or a compressor 61, and (v) control system 72.

The passive-flow nozzle 100 with aerodynamic airfoil configuration 106 is horizontally oriented with the horizontal axis of said passive-flow nozzle 100 at height H is parallel to the ground G. Said passive-flow nozzle having, from the direction of the wind, a pf-intake 101 converging at an angle between 7 and 15 degrees from the pf-intake space 105 to the pf-throat 102, a pf-diffuser 103 diverging from the pf-throat 102 at an angle between 7 and 15 degrees to the pf-exhaust space 104, and a vacuum inlet 80 interposed behind said pf-throat 102 within the transition area to said pf-diffuser 103. A rotating/bearing joint 70 couples said vacuum inlet area 80 of said passive-flow nozzle 100 with said af-exhaust space 204 of said af-diffuser cone 203 of said active-flow-nozzle 200; ultimately, joining (fluidly) said passive-flow nozzle 100 flow field with the back-end of said active-flow nozzle 200 flow field.

The active-flow nozzle 200 comprising a housing 40 with an encased turbine 50, said housing having a housing inlet 41 oriented with the radial axis of said turbine 50 and a housing outlet 42 axially oriented above the vertical axis of said turbine 50. The housing 40 is interposed in the constriction section of said active-flow nozzle 200 and is fluidly coupled with an af-intake 201, diverging perpendicularly at an angle between 7 and 15 degrees from said housing inlet 41 to said af-intake space 202, and af-diffuser cone 203, vertically oriented with the central axis of said housing outlet 42 and diverging vertically at an angle between 7 and 15 degrees from said housing outlet 42 to the af-exhaust space 204. The af-diffuser cone 203 is oriented with the central axis (axially) of said turbine housing outlet 42 and is installed behind the turbine 50 swept area. The af-intake 201 is oriented diagonally from the radial axis of said housing inlet 41 and installed in front of the turbine 50 swept area. The diverged (larger) area of said af-diffuser cone 203, specifically the af-exhaust space 207, is fluidly coupled with said vacuum inlet 80 below said passive-flow nozzle 100 with said rotatable bearing/joint 70.

By converging said af-intake 201 from a larger area of said af-intake space 202 to a smaller flow area of said housing inlet 41 and diverging said af-diffuser cone 203 from a smaller flow area of said housing outlet 42 to the larger flow area of said af-diffuser exhaust space 204, a constricting flow area (throat) is formed by said housing space 40 within said active-flow nozzle 200 flow field through which the intake airflow is accelerated to said turbine 50 in accordance with the operational flow process.

Figure 4:
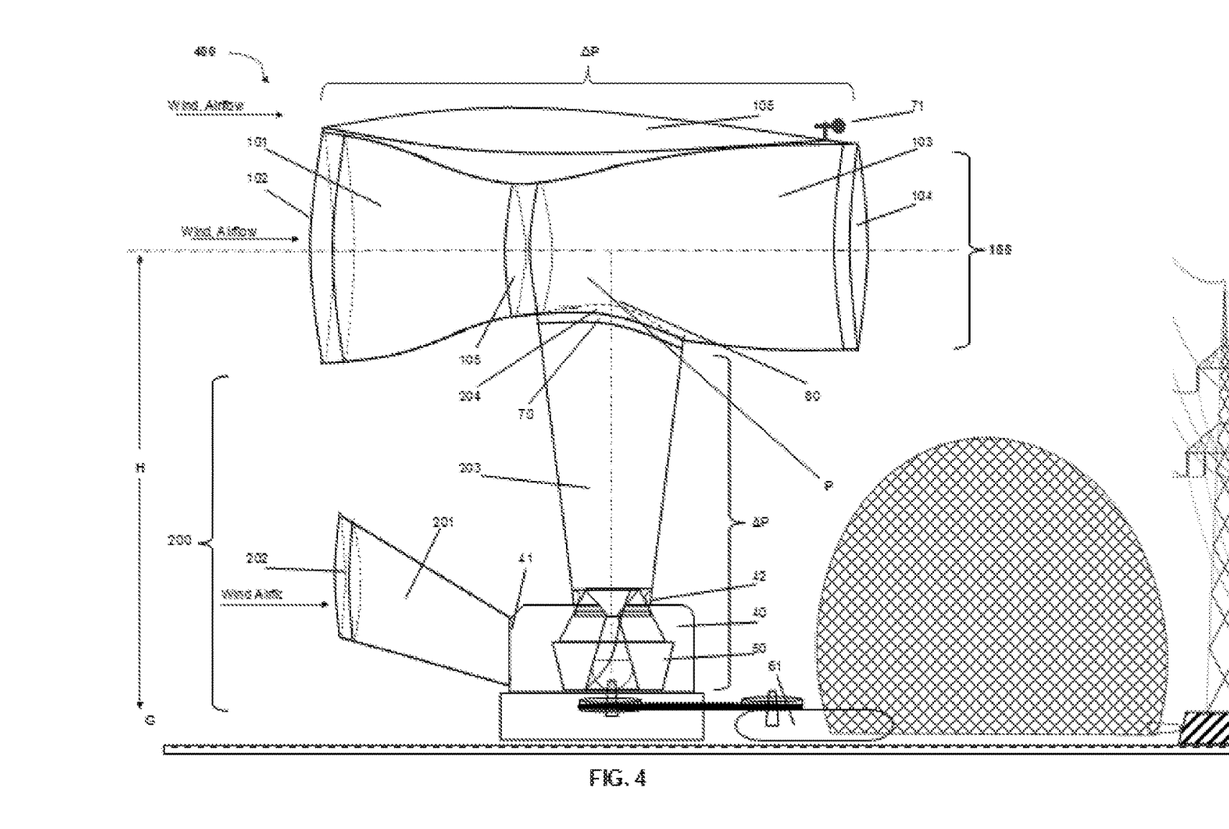
FIG. 4 is a perspective view of another embodiment of the Induced-Flow Power System coupled with an energy storage pressurized structure.

The radial-to-axial turbine 50 encased in said housing 40 has a vertical axle 51. Said turbine 50 may be coupled with an electrical generator 60, or a compressor 61 as illustrated in FIG. 4. The draft tube 53 of said turbine 50 is interposed within said housing outlet 42 and is responsible for discharging the induced airflow to said af-diffuser cone 203 where the airflow is evacuated to the passive-flow nozzle 100 through said vacuum inlet 80 in accordance with the operational flow process of the system.

The operational flow process, according to the illustration of FIG. 1, begins with the wind vane 71 indicating the wind direction and through a control system 72 causing the rotation of said pf-nozzle 100 in the direction of the headwind, airflow.

The open flow wind at height H enters said pf-intake 101 through said pf-intake space 105, accelerates to said pf-throat 102, discharges through said pf-diffuser 103 and evacuates back to the atmosphere through said pf-exhaust space 104. The accelerated airflow produces low pressure P over said vacuum inlet 80 in the pf-throat 102 to said pf-diffuser 103 section.

The aerodynamic airfoil configuration 105 having a curved form accelerates the ambient wind at height H around the exterior surface of said passive-flow nozzle 100, producing low pressure P at said pf-exhaust space 104 which induces a pressure differential ΔP between said pf-intake 101 and said pf-exhaust space 104. The induced pressure differential ΔP triggers an overall net acceleration and evacuation force for the combined (mixed) airflow of the open flow horizontal vector wind through said pf-flow nozzle 100 and the airflow in said active-flow nozzle 200 flow field.

Simultaneously, with the aforementioned flow process, the lower elevation open flow wind enters said af-intake 201 through said af-intake space 202, at the front-end of said active-flow nozzle 200 flow field. The intake airflow is induced in said af-intake space 202 by the pressure differential ΔP, which is induced by the low pressure P that is produced at the back-end of said active-flow nozzle 200 flow field in the fluidly coupled passive-flow nozzle 100. Thereby, the intake airflow effectively accelerates through venturi of said af-intake 201 to said housing space 40. The housing 40, having a logarithm spiral perimeter (golden-spiral) relative to its central axis, evenly distributes the induced intake airflow through said housing space 40, impelling a 360-degree uniform airflow (torque) to said turbine blades 52 of said turbine 50. The turbine 50 redirects the impelled induced intake airflow from radial flow to axial flow, extracts potential and kinetic energy of the airflow, and discharges the flow to said af-diffuser cone 203 through said housing outlet 42. The discharged airflow evacuates from said af-diffuser cone 203 through said af-exhaust space 204 to said vacuum inlet 80, where it mixes with the horizontal vector airflow of said passive-flow nozzle 100. The combined (mixed) airflow is discharged in said ps-diffuser 103 and evacuates through said pf-exhaust 104, where it is recycled back to the atmosphere.

Figure 2:
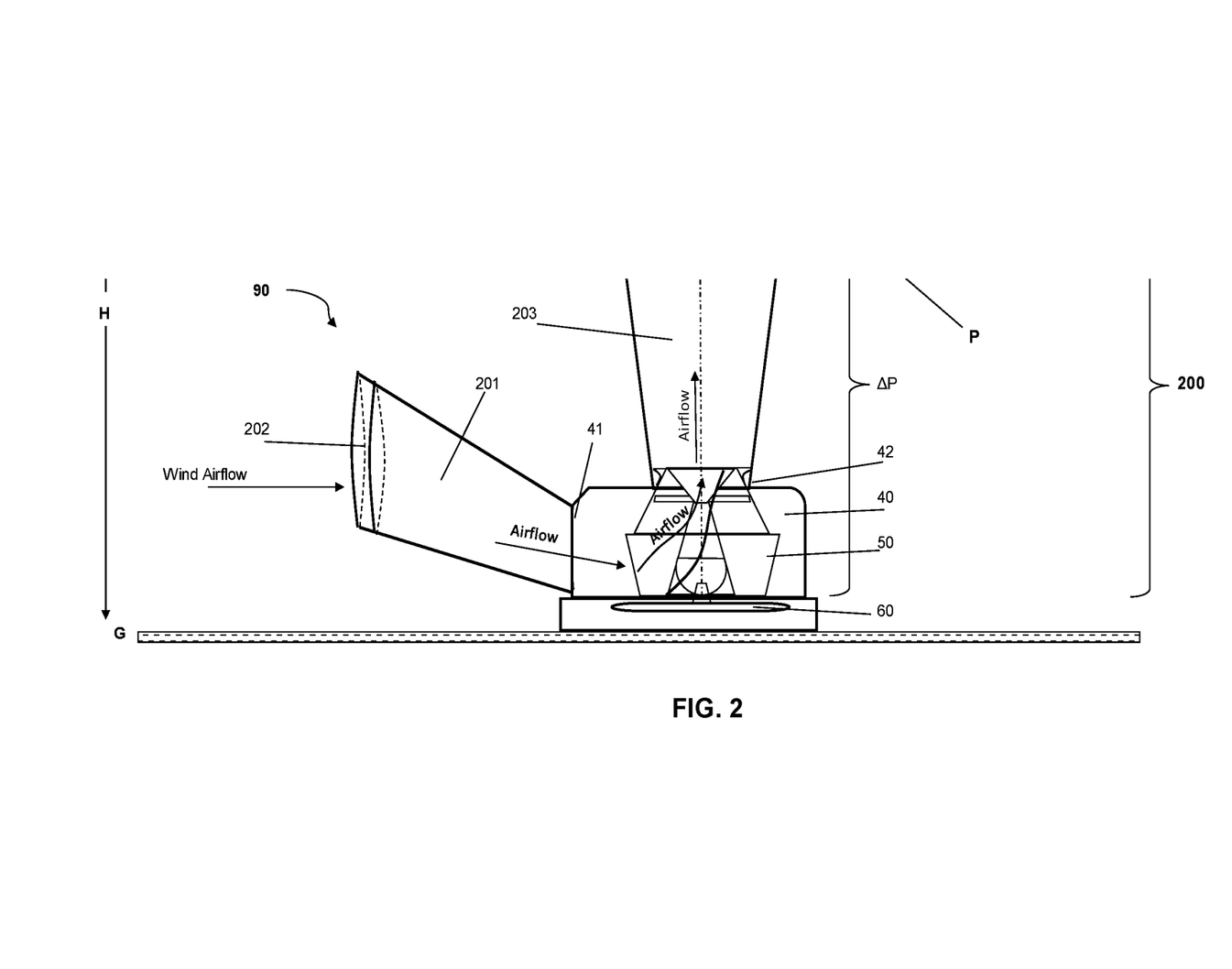
FIG. 2 is an enlarged view of a portion of FIG. 1, according to an embodiment of the present invention.

FIG. 2 is an enlarged view of a portion of FIG. 1, specifically to illustrate the airflow redirecting from radial flow to axial flow in said turbine 50 during the operational flow process described herein. The radial-to-axial turbine 50 receives, diverts and discharges the radial intake induced airflow from said af-intake 201 to said af-diffuser cone 205 while harnessing and converting the induced airflow potential and kinetic energy to mechanical power which can be used for coupling with an electrical generator as illustrated in FIG. or with a compressor as illustrated in FIG. 4. A common number is used in FIG. 2 to identify components common to FIG. 1. Common components are as discussed above in conjunction with FIG. 1.

Both said passive-flow nozzle 100 and said active-flow nozzle 200 may have a screen or other devices interposed within said pf-intake space 102, pf-exhaust space 104, af-intake space 202 and af-exhaust space 204 to prevent the entry of birds or other airborne objects.

The active-flow diffuser cone 205 may be collapsible and flexible and may be constructed in adjoined sections to increase its length (or vertical height H) and to attain the designated height H of the I-FWPS 90.

I-FWPS 100 may be constructed from aluminum, pvc, architectural fabric or other suitable rigid or flexible materials. I-FWPS 100 may be supported by a hollow, framed, or other type of support tower or may be a standalone system as illustrated in the embodiment of FIG. 1.

Figure 3:
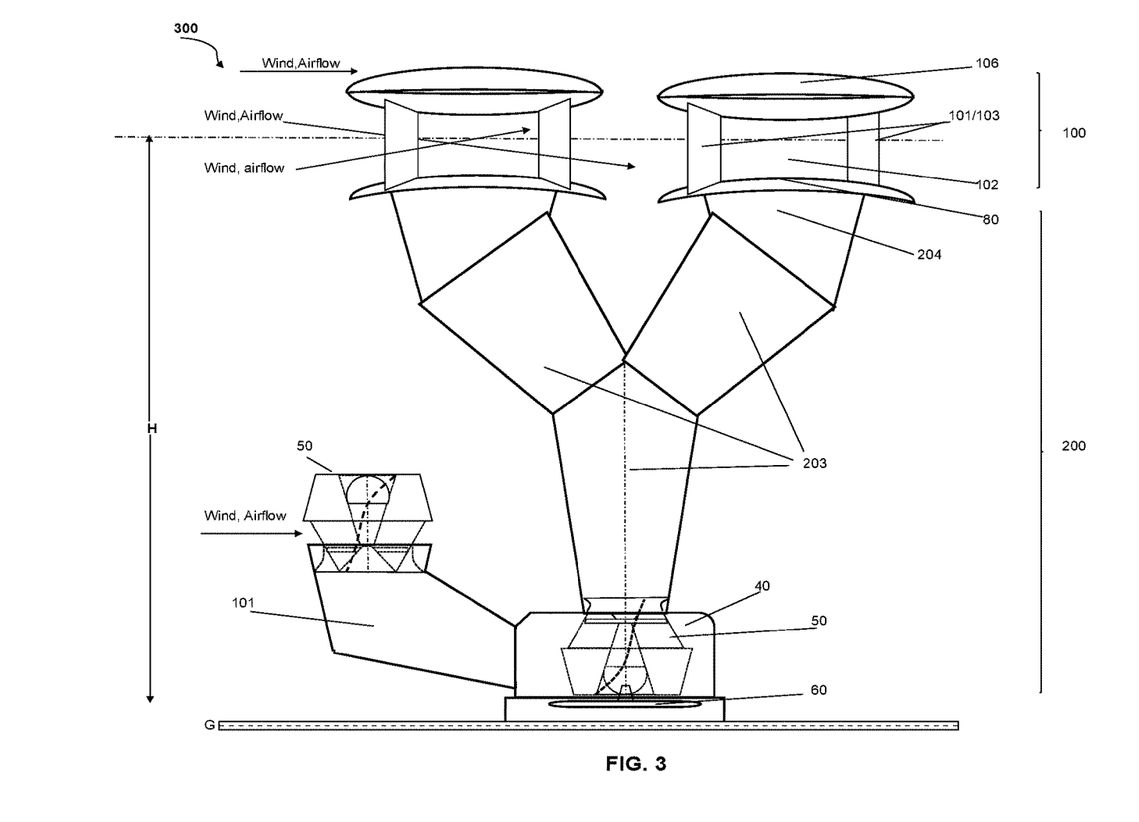
FIG. 3 is a perspective view of another embodiment of a the Induced-Flow Wind Power System, according to another embodiment of the present invention.

FIG. 3 illustrates another embodiment; whereby, the I-FWPS 90 may have a series of omnidirectional passive-flow nozzles 100, coupled with a series of ac-diffuser cones 203 manifold to a single turbine 50. Whereby, the embodiment, as illustrated in FIG. 3, may have an omnidirectional active-flow intake 201 with a lighter version of the turbine 202 configuration interposed within the intake space to direct ambient radial wind flow to axial flow into the af-intake 201 area to said turbine 50. A common number is used in FIG. 3. to identify components common to FIG. 1. Common components are as discussed above in conjunction with FIG. 1.

FIG. 4 illustrates another embodiment of the invention; whereby the turbine 50 may be coupled with a compressor 61 for pumping air to a high-pressure energy storage vessel, such as an air-supported structure. A common number is used in FIG. 4. to identify components common to FIG. 1. Common components are as discussed above in conjunction with FIG. 1.

The invention claimed is:
1. An induced flow wind power system, comprising:
a tubular converging intake extending horizontally from an upstream intake end having an upstream intake area sized for receiving air to a downstream intake end having a downstream intake area, said downstream intake area being smaller than said upstream intake area to accelerate air passing through the tubular converging intake, said downstream intake end being horizontally spaced from the upstream intake end;
a turbine housing mounted downstream from the tubular converging intake;

a turbine rotor mounted inside the turbine housing and configured for rotating with respect to the turbine housing about a rotor axis within the turbine housing, said turbine rotor receiving air radially with respect to the turbine axis and turning air passing through the turbine rotor axially with respect to the turbine axis;

a tubular diverging diffuser mounted downstream from the turbine rotor, said tubular diverging diffuser extending axially with respect to the turbine rotor axis from an upstream diffuser end having an upstream diffuser area to a downstream diffuser end having a downstream diffuser area, said downstream diffuser area being larger than said upstream diffuser area; and a tubular venturi having a tapering upstream portion extending from a venturi entrance having a entrance area to a venturi throat located downstream from the venturi entrance, said venturi throat having a throat area, said throat area being smaller than said entrance area to accelerate fluid passing through the tapering upstream portion of the tubular venturi, said tubular venturi having a tapering downstream portion extending from the venturi throat to a venturi exit located downstream from the venturi throat having an exit area, said exit area being larger than said throat area, and said tubular venturi having a vacuum port positioned in at least one of the venturi throat and the tapering downstream portion of the tubular venturi in fluid communication with the tubular diverging diffuser to draw air from the tubular diverging diffuser when fluid passes through the tubular venturi from the venturi entrance to the venturi exit.

2. The induced flow wind power system as set forth in claim 1, further comprising an airfoil mounted adjacent the tapering downstream portion of the tubular venturi for accelerating airflow around the tubular venturi.

3. The induced flow wind power system as set forth in claim 1, wherein the tapering upstream portion of the tubular venturi has a converging angle between about 7 and about 15 degrees.

4. The induced flow wind power system as set forth in claim 1, wherein the tapering downstream portion of the tubular venturi has a diverging angle between about 7 and about 15 degrees.

5. The induced flow wind power system as set forth in claim 1, wherein the tubular converging intake has a converging angle between about 7 and about 15 degrees.

6. The induced flow wind power system as set forth in claim 1, wherein the tubular diverging diffuser has a diverging angle between about 7 and about 15 degrees.

7. The induced flow wind power system as set forth in claim 1, wherein said tubular venturi is selectively rotatable about a vertical axis.

8. The induced flow wind power system as set forth in claim 1, wherein said tubular converging intake is selectively rotatable about a vertical axis.

9. The induced flow wind power system as set forth in claim 1, wherein said upstream intake end is positioned above said downstream intake end.

10. The induced flow wind power system as set forth in claim 1, wherein said downstream diffuser end is positioned above said upstream diffuser end.

11. The induced flow wind power system as set forth in claim 1, wherein said system comprises one tubular converging intake.

12. The induced flow wind power system as set forth in claim 1, wherein said tubular converging intake and said tubular diverging diffuser are formed from a rigid material.

13. The induced flow wind power systems set forth in claim 1, wherein said tubular venturi is formed from a rigid material.

14. The induced flow A wind power system as set forth in claim 1, wherein said turbine housing is positioned below the tubular venturi.

15. The induced flow wind power system as set forth in claim 1, further comprising a generator operatively connected to the turbine for generating electricity in response to air turning the turbine.

16. The induced flow wind power system as set forth in claim 15, wherein said generator comprises a direct current generator configured for generating a voltage of at least about 12 volts.

17. The induced flow wind power system as set forth in claim 15, wherein said generator comprises an alternating current generator configured for providing at least one of single-phase, two-phase, and three-phase power.

18. The induced flow wind power system as set forth in claim 15, wherein said generator comprises an alternating current generator configured for generating a voltage of at least about 120 volts.

19. An induced flow wind power system, comprising:

a tubular converging intake extending horizontally from an upstream intake end having an upstream intake area sized for receiving air to a downstream intake end having a downstream intake area, said downstream intake area being smaller than said upstream intake area to accelerate air passing through the tubular converging intake, said downstream intake end being horizontally spaced from the upstream intake end;

a turbine housing mounted downstream from the tubular converging intake;

a turbine rotor mounted inside the turbine housing and configured for rotating with respect to the turbine housing about a rotor axis within the turbine housing;

a tubular diverging diffuser mounted downstream from the turbine rotor, said tubular diverging diffuser extending axially with respect to the turbine rotor axis from an upstream diffuser end having an upstream diffuser area to a downstream diffuser end having a downstream diffuser area, said downstream diffuser area being larger than said upstream diffuser area to reduce pressure of air passing through the tubular diverging diffuser;

a tubular venturi having a tapering upstream portion extending from a venturi entrance having a entrance area to a venturi throat located downstream from the venturi entrance having a throat area, said throat area being smaller than said entrance area to accelerate fluid passing through the tapering upstream portion of the tubular venturi, said tubular venturi having a tapering downstream portion extending from the venturi throat to a venturi exit located downstream from the venturi throat having exit area, said exit area being larger than said throat area, and said tubular venturi having a vacuum port positioned in at least one of the venturi throat and the tapering downstream portion of the tubular venturi and in fluid communication with the tubular diverging diffuser to draw air from the tubular diverging diffuser when fluid passes through the tubular venturi from the venturi entrance to the venturi exit; and an airfoil mounted adjacent the tapering downstream portion of the tubular venturi for accelerating airflow around the venturi.

20. An induced flow wind power system, comprising:

a tubular intake extending horizontally from an upstream intake end having an upstream intake area sized for receiving air to a downstream intake end having a downstream intake area, said downstream intake end being horizontally spaced from the upstream intake end;

a turbine housing mounted downstream from the tubular intake;

a turbine rotor mounted inside the turbine housing and configured for rotating with respect to the turbine housing about a rotor axis within the turbine housing, said turbine rotor receiving air radially with respect to the turbine axis and turning air passing through the turbine rotor axially with respect to the turbine axis;

a tubular outlet passage mounted downstream from the turbine rotor, said tubular outlet passage extending axially with respect to the turbine rotor axis from an upstream passage end having an upstream outlet passage area to a downstream passage end having a downstream outlet passage area;

a tubular venturi having a tapering upstream portion extending from a venturi entrance having an entrance area to a venturi throat located downstream from the venturi entrance having a throat area, said throat area being smaller than said entrance area to accelerate fluid passing through the tapering upstream portion of the tubular venturi, said tubular venturi having a tapering downstream portion extending from the venturi throat to a venturi exit located downstream from the venturi throat having an exit area, said exit area being larger than said throat area, and said tubular venturi having a vacuum port positioned in at least one of the venturi throat and the tapering downstream portion of the tubular venturi and in fluid communication with the tubular outlet passage to draw air from the tubular outlet passage when fluid passes through the tubular venturi from the venturi entrance to the venturi exit; and an airfoil mounted adjacent the tapering downstream portion of the tubular venturi for accelerating airflow around the tubular venturi.

* * * * *